Jan. 11, 1966 R. B. STROUT 3,228,268
PORTABLE TUBE END CUTTING TOOL
Filed Sept. 9, 1963
2 Sheets-Sheet 1
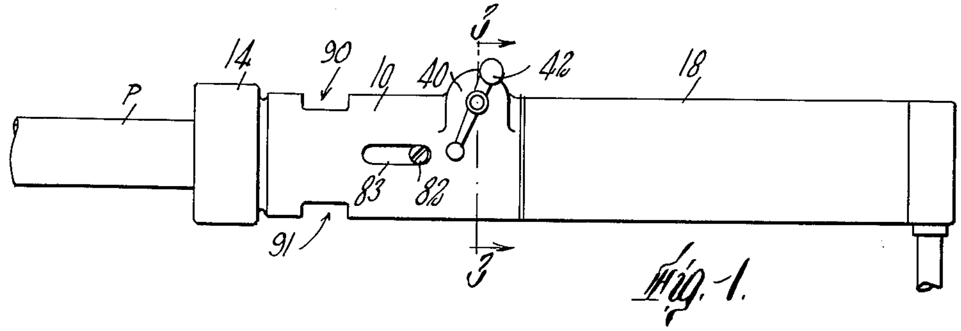
Fig. 1.
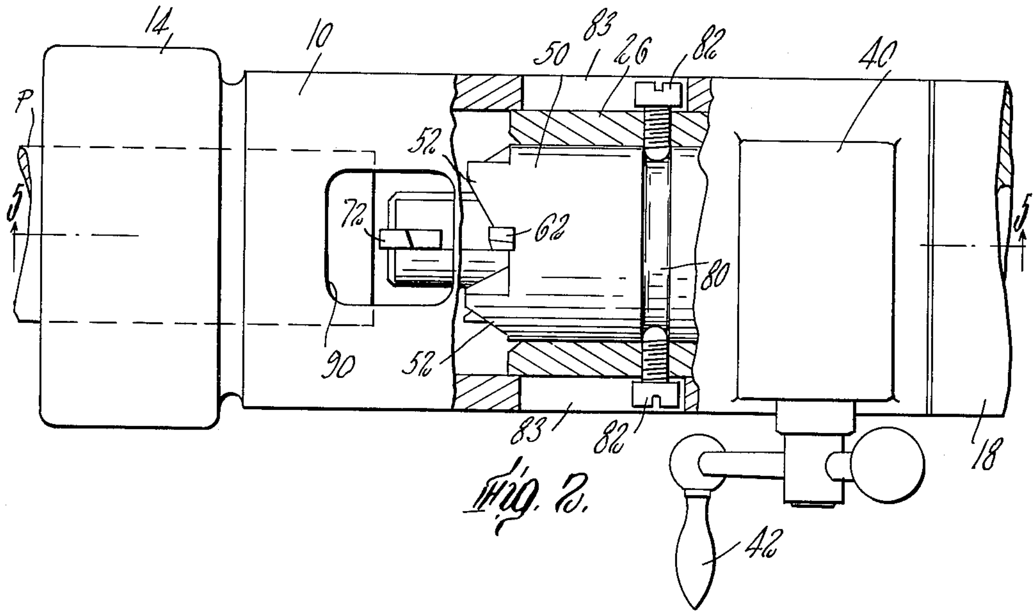
Fig. 2.
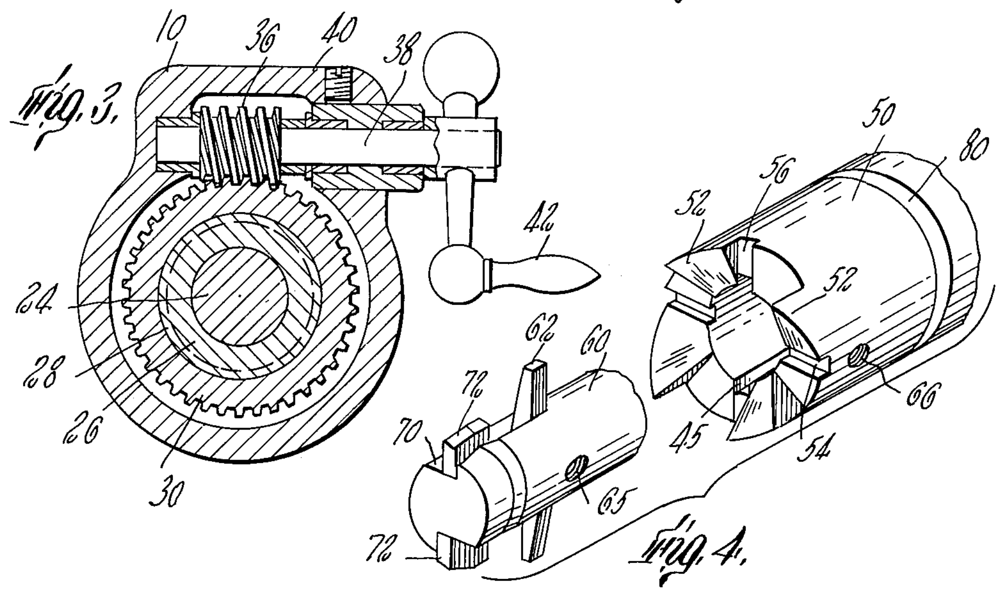
Fig. 3.
Fig. 4.

PORTABLE TUBE END CUTTING TOOL
Filed Sept. 9, 1963 2 Sheets-Sheet 2
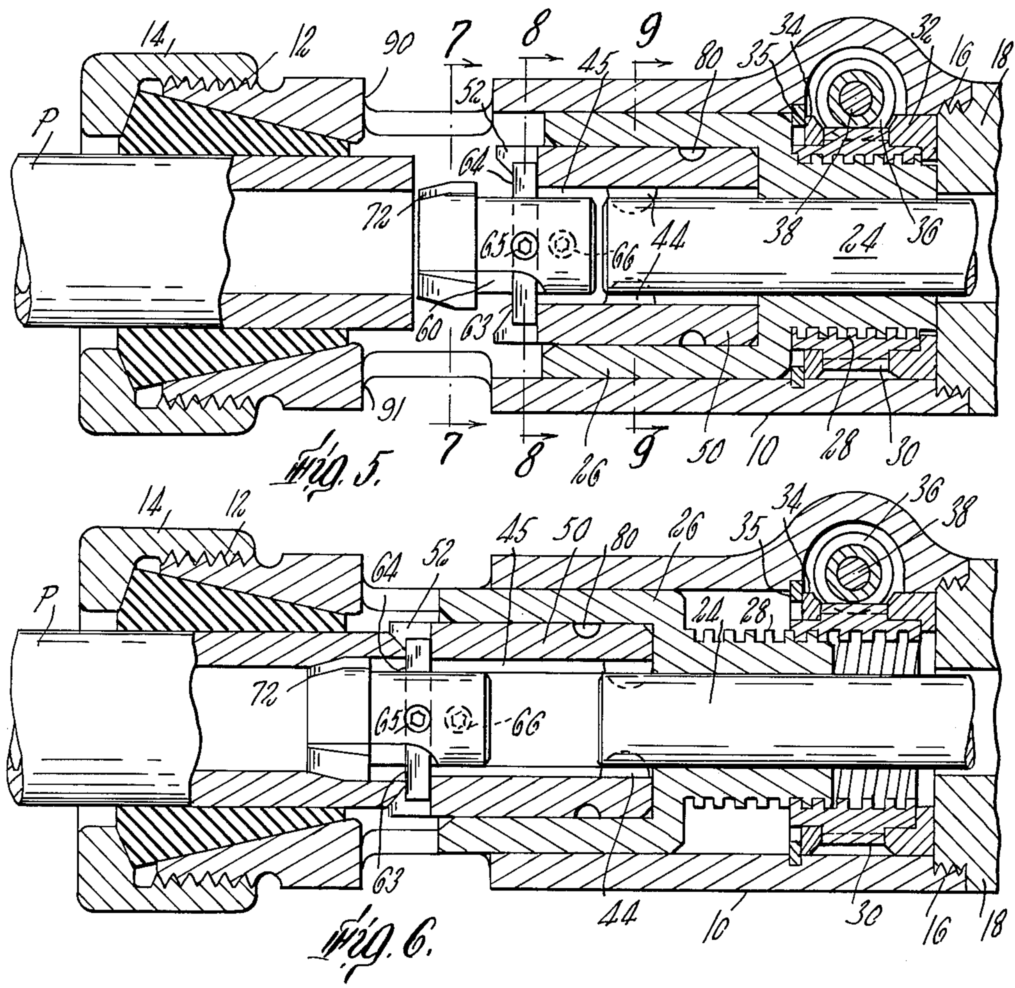
Fig. 5.
Fig. 6.
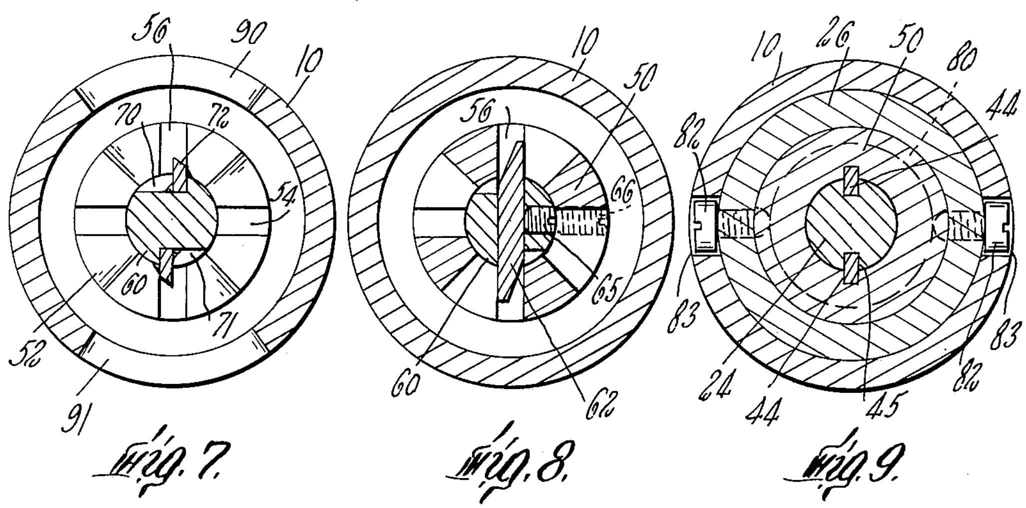
Fig. 7.
Fig. 8.
Fig. 9.

United States Patent Office 3,228,268

Patented Jan. 11, 1966

3,228,268

PORTABLE TUBE END CUTTING TOOL

Russell B. Strout, Winchester, Mass., assignor to Lowry Development Corporation, Winchester, Mass., a corporation of Massachusetts Filed Sept. 9, 1963, Ser. No. 307,412
10 Claims. (Cl. 77—73)

This invention relates to cutting tools and more particularly to a portable tool for preparing the ends of stainless steel and other metal pipe or tubing for welding in end-to-end relation to form continuous tubing.

While the operations performed by the tool can be accomplished on bench milling machines in sequential operations, it is a primary object of this invention to provide a portable tool which can be transported to a site, for example, to confined working spaces, as during installation of tubing in submarines, and which will quickly and accurately prepare the tube ends for on-the-site fitting and welding.

It is a further object of the invention to provide a tool which will hold a tubing and cutter in close coupled relation during an end preparation operation so as to insure reliable alignment and rigidity during the cutting operation for accuracy and precision in the tube end preparation.

It is a further object of the invention to provide an improved tube end preparation tool which can perform several shaping operations simultaneously, as often required in tube end preparation, including a counterbore, tapered at its inner end, an end flat and an outside chamfer.

It is a further object of the invention to provide a cutter head assembly which can be readily removed from the tool and disassembled for separate sharpening or replacement of one or more of the three different sets of cutting edges or so that the cutter sets can be regrouped or rearranged thereby adapting the tool for operation on a variety of sizes of tubing and to produce a variety of end shapes.

To these ends, the portable tool has a collet for externally gripping a tube to present its end to a cutter head which is supported for rotation within a cylindrical housing which also houses the collet to insure accurate axial alignment of the work with the cutter head. While the cutter head rotation is power supplied, the cutter head advances through a worm gear feed.

The tool is designed to chamfer the outside, face off the end and counterbore the inside of the tubing all in a single cutter head advance, the cutter head being readily changed to permit operation on a range of pipe sizes, including, for example, ½-inch, ¾-inch and 1-inch pipe.

The above and other objects of the invention may be better understood when taken in connection with a description of a typical embodiment of the invention shown in the drawings, wherein;

FIG. 1 is a side elevational view of the tool showing a pipe end positioned in the tool;

FIG. 2 is an enlarged plan view of the tool with a portion shown in cross-section, also showing the pipe end;

FIG. 3 is a cross-sectional view taken along the line 3—3 of FIG. 1;

FIG. 4 is an exploded view of a cutter head assembly shown assembled in the tool in FIGS. 1 and 2;

FIG. 5 is a cross-sectional view taken along the line 5—5 of FIG. 2;

FIG. 6 is a cross-sectional view, similar to that shown in FIG. 5, after completion of an operation by movement of certain of the parts from their positions as shown in FIG. 5 to the positions shown in FIG. 6; and FIGS. 7, 8 and 9 are cross-sectional views taken along the lines 7—7, 8—8, and 9—9 of FIG. 5 respectively.

The tool comprises an open ended cylindrical housing 10 which, as shown in FIG. 5, is externally threaded at 12 at the left-hand end to receive a collet nut 14 and internally threaded at the right-hand end at 16 for attachment to the housing of a power source 18, which may conveniently be an air driven motor with reduction gearing, all of standard commercially available construction having a protruding drive shaft 24 which extends inwardly into the housing 10. A suitable motor is one which will develop 1½ horsepower at about 200 r.p.m. The collet nut and other collet parts are also of standard commercial construction.

A cutter support sleeve 26 is mounted within housing 10 around shaft 24 for axial sliding movement relative to the shaft, being externally threaded at its right-hand smaller bore end at 28 to engage an internally threaded annular gear 30 which is retained by bushings 32 and 34 and retainer ring 35 against axial movement but with freedom to rotate relative to housing 10.

Worm gear 36 (FIG. 3), fast on shaft 38 journaled in a boss 40 of housing 10, meshes with gear 30 and may be rotated by hand crank 42 to move sleeve 26 back and forth within the housing.

The left-hand end of sleeve 26 has a larger bore to provide an annular recess and extends beyond the end of shaft 24. The cutter assembly which is designed for telescoping insertion within this recess in keyed engagement with drive shaft 24 for rotation therewith, as by Woodruff keys 44 operating in a keyway 45 of the cutter head, is shown in FIG. 4. It includes a hollow cylindrical member 50 having four integral cutting teeth 52 formed in its end face providing four external chamfering cutting edges. Between the teeth 52 are two perpendicularly related rectilinear cross-slots 54 and 56, the bottom of slot 54 being at a somewhat further distance from the tips of the teeth than the bottom of slot 56 for a purpose to be later described.

A boring bar or plug 60 having an outside diameter for snug insertion within the central bore of member 50 has a transverse hole for the reception and support of a tool bit 62 tapered at its ends to provide two face cutting edges 63 and 64. Bit 62 thus pierces the plug 60 and is held in the hole by screw 65. The bit 62 also is so dimensioned that its ends are received and seated in slot 56 when the plug is fully inserted into member 50, wherein it may be held against withdrawal by a set screw 66. As will be seen, the seating of bit 62 in slot 56 makes it perform as a rotary driving key when the head is rotated in a counterclockwise direction as seen in FIG. 8, as well as a gauge for spacing the bit cutting edges 63, 64 a predetermined distance inwardly of the tips of teeth 52.

The forward end of plug 60 is of enlarged diameter and has two axially extending recesses 70 and 71 providing shoulders against each of which is braised a bit 72 provide two reaming cutting edges.

The cutter head thus has three sets of cutting edges axially spaced from one another—those on parts 52, 62 and 72, the cutting paths of rotation being radially stepped outwardly in progression 72, 62, 52.

The cutter head assembly also has an external groove 80 (FIG. 4) so that when the assembly is inserted into the cutter support 26 it may be held against axial movement relative thereto by two opposed retaining screws 82 (FIG. 9), which extend through slots 83 in housing 10 into threaded engagement with an inward protrusion from sleeve 26 into cutter head assembly groove 80. The screws 82 also limit the axial movement of the sleeve 26 as they engage the extremities of slots 83.

The housing 10 is apertured at 90 and 91 to provide visibility and chip ejection during cutting operations.

In operation, a pipe P is inserted into the collet chuck end of the tool as shown in FIGS. 1, 5 and 6 and the collet nut 14 is tightened to firmly position the pipe coaxially with the axis of the cutter head assembly in the position shown in FIG. 5, with the tool ready to operate upon the end of the pipe or tube P. The shaft 24 is then rotated by the power motor 18 and, by manipulation of the hand crank 42, the cutter head assembly, while rotating, is advanced from the position shown in FIG. 5 to the position shown in FIG. 6 with the result that it shapes the end of the tube P to the contour shown in FIG. 6 with an internal counterbore tapered at its inner end, outside chamfer and a flat face. After completion of the operation the hand wheel is reversed to withdraw the cutting head, the collet is released and the end-prepared tube P is removed from the tool.

Reverting again to FIG. 4, it can be seen that by loosening the set screw 65 after removal of plug 60 from member 50, the tool bit 62 can be readily removed from the plug 60 for resharpening or replacement, the reaming cutters 72 on the plug can be separately sharpened and the teeth 52 on member 50 are also adapted for ready separate resharpening.

Axially deeper slot 54 permits plug 50 to be inserted with a 90° turn from the position shown in FIG. 4, in which case both the end face cutters 63, 64 and the reamers 72 will be spaced further inwardly of the tips of teeth 52, for a different size tube. Or, the plug may be replaced with a different plug having smaller diameter reamers.

What is claimed is:

1. A portable tube end cutting tool comprising a cylindrical housing, a collet contained in one end of said housing for holding a tube extending into said housing in coaxial relation therewith, a motor attached to the other end of said housing, said motor having a drive shaft extending coaxially into said housing towards the end of a tube held by said collet, a cutter support sleeve mounted within said housing around said drive shaft, for axial movement relative to said shaft and housing, means for feeding said sleeve back and forth axially of said housing towards and away from said collet, a cutter head, means on said sleeve for receiving and retaining said cutter head for axial movement with said sleeve and means interlocking said drive shaft with said cutter head for simultaneous rotation relative to said sleeve and housing.

2. A portable tool as claimed in claim 1, wherein said sleeve has a bore at its end adjacent the shaft end of larger diameter than the diameter of said drive shaft to provide an annular recess therebetween, and said cutter head extends into and is retained in said recess.

3. A portable tube end cutting tool comprising a cylindrical housing, a collet contained in one end of said housing for holding a tube extending into said housing in coaxial relation therewith, a motor attached to the other end of said housing, said motor having a drive shaft extending coaxially into said housing towards the end of a tube held by said collet, a cutter support sleeve mounted within said housing around said drive shaft for axial movement relative to said shaft and housing, an annular gear surrounding said sleeve and threaded therewith, a worm gear externally engaging said annular gear, means for rotating said annular gear to feed said sleeve back and forth axially of said housing towards and away from said collet, a cutter head, means on said sleeve for receiving and retaining said cutter head for axial movement with said sleeve and key means interlocking said drive shaft with said cutter head for simultaneous coaxial rotation relative to said sleeve and housing.

4. A portable tube end cutting tool comprising a cylindrical housing, a collet contained in one end of said housing for holding a tube extending into said housing in coaxial relation therewith, a motor attached to the other end of said housing, said motor having a drive shaft extending coaxially into said housing towards the end of a tube held by said collet, a cutter support sleeve mounted within said housing around said drive shaft for axial movement relative to said shaft and housing, means for feeding said sleeve back and forth axially of said housing towards and away from said collet, a cutter head assembly retained within said sleeve for axial movement therewith, said cutter head having three sets of axially spaced cutting edges with the sets of cutting edges having radially stepped paths of rotation, and means interlocking said drive shaft with said cutter head for simultaneous coaxial rotation relative to said sleeve and said housing.

5. A rotary cutter head comprising a cylindrical member having a bore, a plurality of teeth on one end of said member surrounding said bore, a plug inserted into said bore, a bit piercing said plug transversely, the inner surface of the protruding ends of said bit being seated against the end of said member between said teeth, said bit having face cutting edges disposed for rotation in a cutting path disposed axially inwardly of the tips of said teeth and radially inwardly of the cutting path of rotation of said teeth.

6. A rotary cutter head as claimed in claim 5 wherein the teeth end of said member has a configuration providing a transverse slot and said bit ends are seated in said slot and provide a keyed drive between said member and said plug.

7. A rotary cutter head as claimed in claim 6, wherein the teeth end of said member has a configuration providing a second transverse slot, the bottom of which is spaced further from the tips of said teeth than the bottom of said first-named slot for selective seating of said bit ends in either slot.

8. A rotary cutter head adapted to be disassembled into at least three separate pieces for resharpening or replacement of cutting edges on each of said three pieces, said cutting edges collectively forming three sets of cutters, for performing three radially spaced cutting operations simultaneously on a work piece presented to said head, comprising a hollow cylindrical member having a plurality of teeth at one end thereof, a plug inserted into the bore of said member, a bit piercing said plug transversely and providing at its exposed ends on each side of said plug a pair of cutting edges having a cutting path of rotation disposed axially and radially inwardly from the tips of said teeth, and reaming cutting edges on the periphery of said plug having a cutting path of rotation disposed axially beyond the tips of said teeth and radially inwardly of said bit edges cutting path.

9. A rotary cutter head having three axially spaced sets of cutters having radially spaced paths of cutting rotation, comprising a hollow cylindrical member, cutting teeth on one end of said member providing a set of external chamfering cutting edges, the end of said member having a configuration forming a transverse slot between said teeth, a plug partially telescoped into the bore of said member, a bit transversely piercing said plug providing at its exposed ends a set of face cutting edges, said bit ends being seated in said slot, and a set of reaming cutting edges on the periphery of said plug disposed axially outwardly of said bit and the tips of said teeth.

10. A rotary cutter head having three axially spaced sets of cutters having radially spaced paths of cutting rotation, comprising a hollow cylindrical member, cutting teeth on one end of said member providing a set of external chamfering cutting edges, the end of said member having a configuration forming two perpendicular transverse rectilinear slots extending between said teeth at different axial distances from the tips of said teeth, a plug partially telescoped into the bore of said member, a bit transversely piercing said plug providing at its exposed ends a set of face cutting edges, said bit ends being seated in one of said slots to key said plug and member for coaxial rotation, and a set of reaming cutting edges on the periphery of said plug outwardly of said bit, said plug being removable for reseating of said bit in the other of said slots to space said face cutting and reaming edges at different distances from the tips of said teeth.

No references cited.

WILLIAM W. DYER, Jr, *Primary Examiner.*
FRANCIS S. HUSAR, *Assistant Examiner.*